United States Patent
Unsworth et al.

(10) Patent No.: US 12,516,247 B2
(45) Date of Patent: Jan. 6, 2026

(54) BINDER PITCH FOR USE IN CARBON COMPOSITE MATERIALS

(71) Applicant: Arq IP Limited, London (GB)

(72) Inventors: John Francis Unsworth, London (GB); Jeramie Adams, Laramie, WY (US); Seth Taylor Bassham, Laramie, WY (US); Stephen Carl Paspek, Broadview Heights, OH (US); Khalid Baig, Laradmie, WY (US)

(73) Assignee: Arq IP Limited, London (GB)

( * ) Notice: Subject to any disclaimer, the term of this patent is extended or adjusted under 35 U.S.C. 154(b) by 225 days.

(21) Appl. No.: 18/273,640

(22) PCT Filed: Jan. 26, 2022

(86) PCT No.: PCT/US2022/013865
§ 371 (c)(1),
(2) Date: Jul. 21, 2023

(87) PCT Pub. No.: WO2022/164877
PCT Pub. Date: Aug. 4, 2022

(65) Prior Publication Data
US 2024/0110104 A1    Apr. 4, 2024

Related U.S. Application Data

(60) Provisional application No. 63/141,644, filed on Jan. 26, 2021.

(51) Int. Cl.
*C08L 95/00*    (2006.01)
*C10C 3/00*    (2006.01)
(Continued)

(52) U.S. Cl.
CPC .............. *C10C 3/002* (2013.01); *C08L 95/00* (2013.01); *C10C 3/005* (2013.01); *C10C 3/06* (2013.01); *C25C 3/125* (2013.01); *H01M 4/133* (2013.01)

(58) Field of Classification Search
CPC .... C04B 2235/5427; C04B 2235/5436; C04B 2235/5445; C04B 2235/5463;
(Continued)

(56) References Cited

U.S. PATENT DOCUMENTS

| 1,440,724 A | 1/1923 | Soderberg |
| 1,441,037 A | 1/1923 | Soderberg |

(Continued)

FOREIGN PATENT DOCUMENTS

| CN | 101343751 A | 1/2009 |
| EP | 2432052 A1 | 3/2012 |

(Continued)

OTHER PUBLICATIONS

Baruya, "Losses in the coal supply chain", IEA Clean Coal Centre Rep.CCC/212, p. 26, ISBN 978-92-9029-532-7, Dec. 2012.
(Continued)

*Primary Examiner* — Ellen M Mcavoy
*Assistant Examiner* — Chantel Graham
(74) *Attorney, Agent, or Firm* — Dinsmore & Shohl LLP (57) ABSTRACT

Processes are described for the production of a pitch for use in the manufacture of carbon composite materials. The process comprises the steps of providing a purified coal product (PCP), wherein the PCP is in particulate form, and wherein at least about 90% by volume (% v) of the particles are no greater than about 25 μm in diameter; wherein the PCP has an ash content of less than about 10% m; and combining the PCP with a feedstock for pitch to create a combined blended mixture suitable for thermal reaction
(Continued)

followed by distillation to create a resultant pitch. The combined blended mixture comprises at least around 0.1% m and at most around 90% m PCP. Composite materials that find utility as carbon electrodes, particularly electrolytic baked carbon anodes, can be made from combining the pitch and PCP with a filler material, such as a pet coke.

16 Claims, 2 Drawing Sheets

(51) Int. Cl.
  *C10C 3/06* (2006.01)
  *H01M 4/133* (2010.01)
  *C25C 3/12* (2006.01)

(58) Field of Classification Search
  CPC ............ C04B 2235/726; C04B 35/532; C04B 35/62204; C04B 35/6267; C04B 35/63496; C08L 95/00; C10C 3/002; C10C 3/005; C10C 3/06; C25C 3/125; H01M 4/0471; H01M 4/133; H01M 4/1393; H01M 4/364; H01M 4/587
  See application file for complete search history.

(56) References Cited

U.S. PATENT DOCUMENTS

| | | |
|---|---|---|
| 9,777,235 B2 | 10/2017 | Snaith et al. |
| 2005/0254545 A1 | 11/2005 | Daimer |

FOREIGN PATENT DOCUMENTS

| | | | | |
|---|---|---|---|---|
| EP | 2432052 B1 | * | 6/2018 | ........ H01M 10/0525 |
| WO | WO-2020065341 A1 | * | 4/2020 | ............. B01D 21/01 |

OTHER PUBLICATIONS

Kershaw et al., "Structural Characterization of Coal-Tar and Petroleum Pitches", Energy & Fuels, vol. 7, pp. 420-425, 1993.
Russo et al., Investigation on chemical and structural properties of coa- and petroleum-derived pitches and implications on physicochemical properties (solubility, softening and coking), Fuel, vol. 245, pp. 478-487, 2019.
Wombles et al., "Evaluation of the necessary amount of QI in Binder Pitch", The Minerals, Metals & Materials Society, 4 pages, 2009.
International Search Report and Written Opinion pertaining to Application No. PCT/US2022/013865 dated May 30, 2022.

* cited by examiner

BINDER PITCH FOR USE IN CARBON COMPOSITE MATERIALS

CROSS REFERENCE TO RELATED APPLICATION

This application claims priority to U.S. Patent Application Ser. No. 63/141,644, filed on Jan. 26, 2021, entitled "BINDER PITCH FOR USE IN CARBON COMPOSITE MATERIALS," the entire contents of which are incorporated by reference in the present disclosure.

FIELD

The invention relates to manufacture of carbon composite materials, particularly such as carbon-based electrodes and commutators.

BACKGROUND

Coal fines and ultrafines, including microtines, are the small particles of coal generated from larger lumps of coal during the mining and preparation process. While coal fines retain the same energy potential of coal they are generally considered a waste product as the particulate nature of the product renders it difficult to market and transport. As much as 70-90 million tonnes of coal fines are produced in the US alone as waste by-product every year by the mining industry (Baruva, P., Losses in the coal supply chain, IEA Clean Coal Centre Rep.CCC/212, p. 26, December 2012, ISBN 978-92-9029-532-7), the vast majority of which is left unused. Coal fines are therefore generally discarded as spoil close to the colliery forming large waste heaps or contained in large ponds that require careful future management in order to avoid environmental contamination.

Coal seams with high ash content are abundant worldwide, from numerous geological reserves, sometimes as thick seams persisting over a wide geographical area, but many are not exploitable economically due to high ash content (at least 15-20% m dry basis), high sulfur content (1-2% m dry basis), moderately high water content (10-15% m or higher) and with a relatively coarse particle size distribution (<50 mm).

Clean coal technologies have provided for development of new classes of specialty fuels that comprise upgraded clean coal blends as described in International Patent Application No. WO2020/065341 or hybrid liquid-solid mixtures as described in U.S. Pat. No. 9,777,235, with higher energy density and lower levels of emissions. There is a further need to identify additional uses for clean coal compositions derived from waste and low-grade solid hydrocarbons that can contribute to the improvement of the expanding global green economy. For example, there is growing demand for petroleum coke (pet coke) which is a material that is integral to the growth of renewable energy storage technologies and metallurgy where it is used in the production of high-quality carbon anodes. Hence, it would be desirable to provide alternative and economical sources of high-quality feedstocks for such technologies which in turn bring about longer term, more sustainable, and greener future for communities that are dependent upon the coal industry for their economic wellbeing.

The anode carbon block for electrolytic aluminum production generally uses a combination of pet coke and pitch coke as solid aggregates, and a viscous liquid binder pitch, to form a compacted pre-baked 'green coke' anode (for example see U.S. Patent Application No. US 2005/0254545). The anode is baked at high temperatures to calcine the constituents and form a graphitized anode suitable for use in aluminum production. Parameters such as bulk density, true density, apparent porosity, resistivity, compressive strength, and air permeability amongst others are monitored to determine the quality of the anode and its performance in use. U.S. Pat. Nos. 1,440,724 and 1,441,037 describe self-baking carbon electrodes that consist of a pasty mixture of carbon-containing material such as anthracite, coke, and tar or pitch as binder, which is filled into a metal casing held in position within an electric arc furnace by way of contact shoes and a suspension/sliding device. The application of high electric currents, plus the heat of the arc struck by the electrode during the furnace operation, develops sufficient heat to melt the material filled into the casing and form a paste, then to coke the formed paste, and finally bake the electrode.

Chinese Patent Application No. CN101343751A describes an electrolytic aluminum anode carbon block mixed with anthracite and petroleum coke and a preparation method thereof. Using low ash or treated anthracite instead of traditional pet coke as filler in the manufacture of the aluminum electrolytic anode carbon block material is intended to expand the use of anthracite and reduce dependency upon imported petroleum derived products. Hence, efforts to reduce reliance on petroleum derived feedstocks in the production of high-grade electrolytic aluminum anodes has hitherto focused on replacement of the solid pet coke components.

Binder pitch is an important component of carbon composite materials used to make anodes and serves to hold together and fill in voids in anode grade coke after it is crushed and sized so that it can be formed into baked anodes. The binder and baking process forms additional anisotropic coke to increase the density of the constituent anode pet coke and produce the shape necessary for use as anodes. This is required to make anodes of appropriate quality for efficiency and longevity in the production of aluminum, for example. Binder pitch may be comprised of coal tar pitch or petroleum pitch, as well as mixtures thereof. Coal tar pitch is chemically different from petroleum pitch. Petroleum pitch is typically produced from fluid catalytic cracker (FCC) bottoms (e.g. decant or slurry oils), in that it is significantly more aromatic. Coal tar pitch and petroleum-derived pitch comprise mixtures of similar-sized polycyclic aromatic hydrocarbons (PAHs), but petroleum pitch contains more hydrogen, typically 5-6% m compared with 3-4% hydrogen in coal tar pitch because of many more aliphatic side chains in PP (J. R. Kershaw & K. J. T. Black, Structural Characterization of Coal-Tar and Petroleum Pitches, Energy & Fuels 1993, 7, 420-425, and C. Russoa, A. Ciajoloa, F. Stanzionea, A. Tregrossia, M. M. Olianoa, A. Carpentierib, B. Apicellaa, Investigation on chemical and structural properties of coal- and petroleum derived pitches and implications on physico-chemical properties, Fuel, 2019, 245, 478-487.) Besides this chemical difference, North American coal tar pitch further contains between 10-15 wt % of primary quinoline-insolubles (QI), whereas petroleum derived pitch contains little if any primary QI. Primary QI is about 50% carbon black with the balance comprising residual coal carry over and fine coke particles. Fine sized primary QI adds strength to the bond between the coke filler material and coke particles and reduces shrinkage cracks in the petroleum pitch coke.

Whilst the QI is of very low value itself, the primary concern for manufacturers of electrolytic anodes of the type described is in knowing the amount of pitch and QI content so that proper formulation can be achieved for wetting the coke according to their procedures.

It would be desirable to provide improved feedstocks for use in the production of anode grade coke, especially for use in the production of electrolytic and battery quality anodes. It would also be desirable to provide improved feedstocks that comprise a greater diversity of starting materials, but which meet the stringent requirements for electrolytic and battery quality anodes. In addition, it would be desirable to utilise feedstocks that are derived from materials otherwise classified as discard, thereby allowing for upcycling of waste and reducing the further accumulation of waste fines as a by-product of the coal mining industry.

SUMMARY OF THE INVENTION

The invention relates to improvements in processes for the production of compositions that comprise petroleum or coal tar derived pitch, having improved properties including increased QI content, that are suitable for use as binders in manufacture of carbon composite materials such as electrodes and brushes for commutators.

The present inventors have developed a process that provides for the utilisation of very high quality (low ash, sulfur, and water content) purified coal products as an additive for pitch, such as coal or petroleum pitch, or feedstocks for pitch manufacture, such as decant oil. These purified coal products have typically been upgraded from waste from coal tailings ponds, impoundments or tips and reject materials from current coal production processing (e.g. thickener underflow or tailings underflow waste streams), as well as high-ash content inferior seam coal, hitherto not exploitable economically. An advantage of the use of the purified coal products in pitch, according to the invention, is to increase the yield of pitch as well as to improve the quality in relation to QI content, rendering pitch (especially petroleum derived pitch) more suitable for the production of carbon composite materials used in the manufacture of high grade electrolytic and battery anodes. Furthermore, due to the fact that binder materials are often more expensive than the filler coke, it is of importance to optimize the amount and quality of pitch based on the physical and chemical properties of the baked anode.

According to a first aspect of the present invention, there is provided a process for the production of a pitch for use in the manufacture of carbon composite materials, the process comprising the steps of:
(i) providing a purified coal product (PCP), wherein the PCP is in particulate form, and wherein at least about 90% by volume (% v) of the particles are no greater than about 25 μm in diameter; and wherein the PCP has an ash content of less than about 10% m; and
(ii) combining the PCP with a feedstock for pitch to create a combined blended mixture suitable for thermal reaction followed by distillation to create a resultant pitch;
wherein the combined blended mixture comprises at least around 0.1% m and at most around 90% m PCP.

A second aspect of the invention provides a process for the production of a pitch for use in the manufacture of carbon composite materials, the process comprising the steps of:
(i) providing a purified coal product (PCP), wherein the PCP is in particulate form, and wherein at least about 90% by volume (% v) of the particles are no greater than about 25 μm in diameter; and wherein the PCP has an ash content of less than about 10% m; and
(ii) combining the PCP with a pitch to create a combined blended mixture;
wherein the mixture comprises at least around 0.1% m and at most around 75% m PCP.

A third aspect provides a process for increasing the quinoline insoluble (QI) content of a binder pitch suitable for use in the manufacture a carbon electrode, the process comprising adding a quantity of a purified coal product (PCP) to the binder pitch, wherein the PCP is in particulate form, and wherein at least about 90% by volume (% v) of the particles are no greater than about 25 μm in diameter; wherein the PCP has an ash content of less than about 5% m and a water content of less than around 5% m.

A fourth aspect of the invention provides a use of a purified coal product (PCP), wherein the PCP is in particulate form, and wherein at least about 90% by volume (% v) of the particles are no greater than about 25 μm in diameter; and wherein the PCP has an ash content of less than about 5% m, as an additive to increase the quinoline insoluble (QI) content of a petroleum or coal tar binder pitch.

A fifth aspect provides a composition for use in the manufacture of a carbon electrode, the composition comprising a mixture of a purified coal product (PCP), wherein the PCP is in particulate form, and wherein at least about 90% by volume (% v) of the particles are no greater than about 25 μm in diameter; wherein the PCP has an ash content of less than about 5% m and a water content of less than around 5% m; and a petroleum pitch.

A sixth aspect provides a carbon electrode comprised of a filler coke and a binder pitch, wherein the binder pitch comprises the composition as described herein.

A seventh aspect of the invention provides a baked carbon electrolytic anode comprised of a composite material obtainable from a process of baking a green composition comprised of a filler coke and a binder pitch, wherein the binder pitch comprises a composition as described herein.

An eighth aspect of the invention provides process for the manufacture of a carbon electrode, comprising combining a filler coke with a pitch binder that is comprised of the composition as described herein and pyrolyzing at a temperature of at least around 400° C., optionally at least around 430° C. Carbon electrodes obtainable via this process are also provided for in this aspect.

A ninth aspect of the invention provides a method for improving the air and carbon dioxide reactivity of an electrolytic carbon electrode comprising incorporating a purified coal product (PCP) into a binder pitch used in the manufacture of the electrode, wherein the PCP is in particulate form, and wherein at least about 90% by volume (% v) of the particles are no greater than about 25 μm in diameter; wherein the PCP has an ash content of less than about 5% m. In one embodiment the method increases the working lifetime of the anode compared to an anode that does not comprise PCP as an additive in the binder pitch.

It will be appreciated that the invention may be subjected to further combinations of the features disclosed herein but which are not explicitly recited above.

DRAWINGS

The invention is further illustrated by reference to the accompanying drawings in which.

DETAILED DESCRIPTION OF THE INVENTION

All references cited herein are incorporated by reference in their entirety. Unless otherwise defined, all technical and scientific terms used herein have the same meaning as commonly understood by one of ordinary skill in the art to which this invention belongs.

Prior to setting forth the invention in greater detail, a number of definitions are provided that will assist in the understanding of the invention.

As used herein, the term "comprising" means any of the recited elements are necessarily included and other elements may optionally be included as well. "Consisting essentially of" means any recited elements are necessarily included, elements that would materially affect the basic and novel characteristics of the listed elements are excluded, and other elements may optionally be included. "Consisting of" means that all elements other than those listed are excluded. Embodiments defined by each of these terms are within the scope of this invention.

The term "coal" is used herein to denote readily combustible sedimentary mineral-derived solid hydrocarbonaceous material including, but not limited to, hard coal, such as anthracite; bituminous coal; sub-bituminous coal; and brown coal including lignite (as defined in ISO 11760:2005). "Native" or "feedstock" coal refers coal that has not been subjected to extensive processing and comprises a physical composition (e.g. maceral content) that is substantially unchanged from the point of extraction. In contrast, the terms "coal-derived product", "coal replacement product", "purified coal compositions" and "purified coal products" (PCP) are used herein to refer to various coals which have been subjected to one or more processes that lead to a change in physical and/or chemical compositions of the coal such that it is substantially changed from the point of extraction—i.e the natural state.

As used herein, the term "ash" refers to the inorganic—e.g. non-hydrocarbon—mineral component found within most types of fossil fuel, especially that found in coal. Ash is comprised within the solid residue that remains following combustion of coal, sometimes referred to as fly ash. As the source and type of coal is highly variable, so is the composition and chemistry of the ash. However, typical ash content includes several oxides, such as silicon dioxide, calcium oxide, iron (III) oxide and aluminium oxide. Depending on its source, coal may further include in trace amounts one or more substances that may be comprised within the subsequent ash, such as arsenic, beryllium, boron, cadmium, chromium, cobalt, lead, manganese, mercury, molybdenum, selenium, strontium, thallium, and vanadium.

As used herein the term "low ash coal" refer to native coal that has a proportion of ash-forming components that is lower when compared to other industry standard coals. Typically, a low ash native or feedstock coal will comprise less than around 12% m ash. The term "deashed coal", or the related term "demineralised coal", is used herein to refer to coal that has a reduced proportion of inorganic minerals compared to its natural native state. Ash content may be determined by proximate analysis of a coal composition as described in ASTM D3174-12 Standard Test Method for Ash in the Analysis Sample of Coal and Coke from Coal. In embodiments of the present invention ash content in purified coal product of less than 10% m, less than 8% m, less than 5% m and less than 2% m or even less than 1% m are obtained. Indeed, the present inventors have found quite unexpectedly that products having very low ash contents of around or below 1% m can be obtained from starting material that is as much as 50% m ash without having to sacrifice yield levels that render the process un-commercial.

Inferior coal is a term used in geological survey of the quality of coal seams (e.g. UK coal survey, 1937) and refers to intrinsic ash in coal bands or coal seams above 15.1% m and below 40.0% m. Coal bands or coal seams consisting of inferior coal contain mineral matter intimately mixed within the coal itself and consequently are very difficult to purify using conventional coal processing techniques.

As used herein, the term "coal fines" refers to coal in particulate form with a maximum particle size typically less than 1.0 mm. The term "coal ultrafines" or "ultrafine coal" or "ultrafines" refers to coal with a maximum particle size typically less than 0.5 mm (500 microns (μm), approximately 0.02 inches). The term "coal microfines" or "microfine coal" or "microfines" refers to coal with a maximum particle size typically less than 20 μm.

Most suitably the particle size of the coal fines that is utilised as feedstock may be at most 100 μm or 500 μm. Specifically, the maximum average particle size may be at most 500 μm. More suitably, the maximum average particle size may be at most 300 μm, 250 μm, 200 μm, 150 μm, or 100 μm. Most suitably, the maximum average particle size may be at most 75 μm, 50 μm, 40 μm, 30 μm, 20 μm, 10 μm, or 5 μm. The minimum average particle size may be 0.01 μm, 0.1 μm, 0.5 μm, 1 μm, 2 μm, or 5 μm. Hence, in particular embodiments the invention includes utilisation of nanoscale coal fines with average particle sizes in the sub-micron range.

An alternative measure of particle size is to quote a maximum particle size and a percentage value or "d" value for the proportion by volume of particles within the sample that fall below that particle size. For the present invention, any particle size of coal fines that is suitable for blending with petroleum or coal tar pitch is considered to be encompassed by the invention. Suitably, the particle size of the coal fines is in the ultrafine range. Most suitably the particle size of the coal fines is in the microfine range. Specifically, the maximum particle size may be at most 500 μm. More suitably, the maximum particle size may be at most 300 μm, 250 μm, 200 μm, 150 μm, or 100 μm. Most suitably, the maximum particle size may be at most 75 μm, 50 μm, 40 μm, 30 μm, 20 μm, 10 μm, or 5 μm. The minimum particle size may be 0.01 μm, 0.1 μm, 0.5 μm, 1 μm, 2 μm, or 5 μm. Any "d" value may be associated with any one of these particle sizes. Suitably, the "d" value associated with any of the above maximum particle sizes may be d99, d98, d95, d90, d80, d70, d60, or d50. To maximize the reaction of micronized coal with coal tar or petroleum pitch during coking it is desirable for the coal particle size to be both relatively homogeneous and small, in order to enable the small particles to be well-dispersed in the residue oil phase. For instance, in a specific embodiment of the invention the microfine coal has a d90 of <100 μm, <90 μm, <70 μm, <50 μm optionally <20 μm. Suitably, the microfine coal has a d99 of <70 μm, <60 μm, <50 μm, <40 μm optionally <20 μm.

As used herein, the term "water content" refers to the total amount of water within a sample and is expressed as a concentration or as a mass percentage (% m). When the term refers to the water content in a coal sample it includes the inherent or residual water content of the coal, and any water or moisture that has been absorbed from the environment. As used herein the term "dewatered coal" refers to coal that has an absolute proportion of water that is lower than that of its natural state. The term "dewatered coal" may also be used to refer to coal that has a low, naturally occurring proportion of water. Water content may be determined by analysis of a native or purified coal composition as described in ASTM D3302/D3302M—17 Standard Test Method for Total Moisture in Coal. PCP may comprise a water content of less than 50% m, suitably less than 40% m, typically less than 30% m, optionally less than 20% m. In certain embodiments the PCP comprises a water content of not more than 5% m.

The term "hydrocarbonaceous material" as used herein refers to a material containing hydrocarbons; hydrocarbons being an organic compound consisting substantially of the elements, hydrogen and carbon. Hydrocarbonaceous material may comprise aliphatic as well as aromatic hydrocarbons.

Residue oil in the context of this application is understood to refer to residue that is obtained after at least one stage of oil refinement such as residue from refinery atmospheric and vacuum distillation of crude oil feedstock; residue from other refinery processes, such as Slurry oil from catalytic crackers, hydrocrackers and/or bottoms from naphtha crackers (carbon black feedstock); slop oils; decanted oils (DO); oils and tars produced by pyrolysis of coal (e.g. coal-tar pitch), wood and biomass; black liquor, the waste product from the Kraft process of wood pulp manufacture; lower viscosity oils from the refinery (e.g. cycle oils, gas oils etc.). Residue oil may also be lower viscosity oils from biofuel manufacture (e.g. fatty acid methyl esters) and bio-oils from biomass pyrolysis used to pre-mix microfine coal to a paste, before blending with any one of the above hydrocarbonaceous liquid materials.

Petroleum coke (pet coke or pet-coke) is a solid by-product of the petroleum refining process. Typically formed using the delayed coker process using heavy petroleum feedstocks as a starting material, pet-coke can be classified as either fuel grade pet-coke (shot coke) or anode grade pet-coke (sponge coke). Anode grade pet-coke (raw pet coke (RPC), green pet coke (GPC) or non-calcined pet-coke) is used as a feedstock for calcination in order to produce calcined petroleum coke (CPC). CPC is used in the aluminium, graphite electrode (e.g. for use in manufacture of lithium batteries), steel and titanium dioxide industries. Conventionally, pet-coke properties can vary considerably depending on the chemical composition of the oil feedstock used to produce it. Hence, pet-coke can be hard or relatively soft; physically, pet-coke can resemble highly porous rocks, or it can resemble small marbles, ranging in size from a grain of sand to a large pebble.

The term 'petroleum pitch' as used herein, typically refers to an asphaltic vacuum residue stream recovered from a thermal, thermal-catalytic, or catalytic hydrocracking process feed which derived from crude oil, or high-boiling hydrocarbon feedstock such as vacuum or atmospheric petroleum residue, petroleum from oil shales, coal derived oils, decant oil, oil sands, resin oils, black oils, bio-based crude oils, pyrolysis oils from recycled and renewable sources as well as other similar hydrocarbon streams, or a combination of these, each of which may be a direct distillation stream. Petroleum pitch is highly aromatic and may be in solid or liquid (tar) form at room temperature and pressure. It differs from carbon or coal tar pitch which is a primary product from the distillation of coal tar. Since pitch is a heterogeneous mixture of mostly aromatic compounds, it does not go through a solid-liquid phase change when heated, and therefore it does not have a true melting point but has a glass transition. When exposed to a rise in temperature, pitch softens and becomes less viscous. The softening point (SP) is arbitrarily defined according to standard methods including ASTM D61-15 (2019) for pitches with a softening point below 80° C., and ASTM D2319 or D3104 for pitches with softening points above 80° C. Both petroleum and carbon (coal tar) pitch may be used individually or blended in combination with pet coke as a binding agent in the production of carbon anodes such as for aluminium smelters, or graphite electrodes for electric arc furnace steel production.

The term 'quinoline-insolubles' or 'QI,' as used herein, refers to solid particulate content entrained within a pitch composition. The QI material may be of diverse origin and when concentrated within coal tars may contain particulate coal, coke powder, carbon black, ash particles, and mineral particles (e.g. silica). QI material is typically divided into two classes based on the particle size: primary QI (<600 lam) and secondary QI or tar sludge (coarser particles, >600 μm). Secondary QIs can also be formed due to the agglomeration of primary QI particles with/around other tar components. The primary QI parameter is the initial measure of carbonaceous and inorganic solid content. Secondary QI is typically the mesophase produced after pyrolysis. In accordance with embodiments of the invention, the primary QI should not be of a size that could clog the pores and particle interstices in the coke and prevent binder penetration, consequently its size is an important consideration. Primary QI has been described as below 2 microns in size, nearly all below 5 microns (Kremer, H. A. & Cukier, S, Structures of insoluble carbon in tars and pitches, Microscopy 1983, 132 (3), pp. 303-314). More recent investigations indicate that in coal tar pitches:

- 95% of primary QI is below 10 microns in size (He X., Liu D., Wamg Y., Chen Y., Zhang H., Analysis and Characterization of Quinoline Insolubles in Coal Tar, Materials Reports 2017, 31 (22): 142-145. http://www-.mater-rep.com/EN/10.11896/j.issn.1005-023X.2017.022.028).
- Primary QI has a size distribution ranging from a minimum of 0.2 microns to a maximum of 25 microns with the main peak at 1 micron plus a shoulder peak at 5 microns (Ya-ming, Z., Xue-fei Z., Li-juan G., Lv J., Jun-xia C., Shi-quan L., Properties and micro-morphology of primary quinoline insoluble and mesocarbon microbeads, Journal of Materials Science, September 2016, 51(17). DOI: 10.1007/s10853-016-0080-8).

Although a typical anode coke contains some microporosity (<2 nm) and mesoporosity (2-100 nm), the major part of its pore volume is macroporosity (200 nm to 100 microns), particularly in the size range 1-10 microns (Chevarin F., Azari, K., Ziegler D., Gauvind R., Fafard M. & Alamdar H., Substrate effect of coke particles on the structure and reactivity of coke/pitch mixtures in carbon anodes, Fuel 2016, 183, pp. 123-131). The most suitable size of primary QI is consistent with penetration of these anode coke pores without leading to clogging. An advantage of the use of the purified coal products in pitch, according to the invention, is to increase the yield of pitch as well as to improve the quality in relation to QI content, rendering pitch (especially petroleum derived pitch) more suitable for the production of carbon composite materials (R. H. Wombles, J. T. Baron, S. McKinney, Evaluation of the necessary amount of QI in binder pitch, Light Metals, 2009 pp. 913-916).

Demineralising and dewatering of coal fines to produce a purified coal product (PCP) that can be used as a feedstock for the improved pitch binder compositions of the invention may be achieved via a combination of froth flotation separation, specifically designed for ultrafines and microtine particles, plus mechanical and thermal dewatering techniques. Typically, PCP may be produced from a feedstock of particulate coal via processes that comprise particle size reduction, mineral matter removal, dewatering and drying. Some or all of these steps may be altered or modified to suit the specification of the starting material or of the desired end product. The key process steps are summarised below in relation to a typical starting material derived from an impoundment, tailings pond or production tailings underflow.

Particle Size Reduction

The starting material is reduced to a particle size of d80=30-50 microns (or finer in some coals) to achieve efficient separation to a target mineral matter (ash) content of 5-8% m. To achieve this, a feed comprising the starting material is diluted with water to achieve a solids content of in the range 20-40% m, then ground in a ball or bead mill depending on the top size of the feedstock. The product is screened at a size range of approximately 100 microns to exclude particles above this size. A dispersant additive may be included to optimise energy use during size reduction (e.g. lignin-based dispersants, such as Borresperse, Ultrazine and Vanisperse manufactured by Borregaard, 1701 Sarpsborg, Norway). Suitable equipment for size reduction is manufactured by Metso Corporation, Fabianinkatu 9 A, PO Box 1220, FI-00130 Helsinki, FIN-00101, Finland; Glencore Technology Pty. Ltd., Level 10, 160 Ann St, Brisbane QLD 4000, Australia, and FLSmidth, Vigerslev Alle 77, 2500 Valby, Denmark.

Ash Removal

One or a series of froth flotation stages are carried out to bring the entrained mineral content down to the target level. For some coals where the mineral matter is disseminated mainly within sub-10-micron size domains, more than one stage of flotation following further milling may be required to achieve a low ash level.

During froth flotation a coal slurry is diluted further with water typically to a range of 5-20% m solids then collected in a tank and froth flotation agents, known as frother (e.g. methyl iso-butyl carbinol and pine oil) and collector (e.g. diesel fuel or other hydrocarbon oil, and Nasmin AP7 from Nasaco International Co., Petite Rue 3, 1304 Cossonay, Switzerland), are added using controlled dose rates. Micro particle separators (e.g. Flotation test machines manufactured by FLSmidth, Vigerslev Alle 77, 2500 Valby, Denmark, by Metso Corporation, Fabianinkatu 9 A, PO Box 1220, FI-00130 Helsinki, Finland, and GTEK Mineral Technologies Co. Ltd.) filled with process water and filtered air from an enclosed air compressor are used to sort hydrophobic carbon materials from hydrophilic mineral materials. Froth containing hydro-carbonaceous particles overflows the tank and this froth is collected in an open, top gutter. The mineral pulp is retained in the separation tank until discharged, whereas the demineralised coal slurry is de-aerated, before being subjected to additional processing.

Dewatering

The concentrate from froth flotation is dewatered with a filter-press or tube-press to a target range of 20-50% m depending on the actual particle size, under pressure or vacuum, sometimes with air-blowing, to remove water by mechanical means, in order to generate feed for the extruder. Suitable filter-press equipment is manufactured by Metso, FI-00130 Helsinki, Finland, FLSmidth, Valby, Denmark, and by Outotec. Rauhalanpuisto 9, 02230 Espoo, Finland.

In some instances, flocculant (or thickener, e.g. anionic polyacrylamide additive manufactured by Nalco Champion, 1 Ecolab Place, St. Paul, MN 55102-2233, USA) is added to optimise settling properties and underflow density. To optimise the procedure settling tests are carried out to measure settling rates and generate a settling curve, tracking underflow density with time.

Filtration may also be necessary depending on the filtration rate and resultant cake moisture. To optimise the procedure feed % solids (thickened/un-thickened), feed viscosity, pH and filtration pressure will be measured, Filter cloths are chosen after assessment of cake discharge and blinding performance. Suitable filter cloths are manufactured by Clear Edge Filtration, 11607 E 43rd Street North, Tulsa, Oklahoma 74116 USA.

In some circumstances a Decanter Centrifuge can be incorporated into the process design to concentrate the solids content prior to the filter press. Suitable equipment is manufactured by Alfa Laval Corporate AB, Rudeboksvägen 1, SE-226 55 Lund, Sweden.

Drying

The PCP product may be dried thermally to reduce water to below 5% m. This may be achieved directly on the PCP, or by pelleting it first to facilitate handling, by conveying it to a belt dryer where oxygen-deprived hot process air is blown directly over the microfine coal. Suitable equipment is manufactured by STELA Laxhuber GmbH, Öttingerstr. 2, D-84323 Massing, Germany or by GEA Group Aktiengesellschaft, Peter-Müller-Str. 12, 40468 Düsseldorf, Germany. In some embodiments of the invention drying may not be required and the PCP may be utilised in any of the subsequent electrode manufacture in the form of a wet cake with water content of up to 50% m, suitably up to 40% m, typically up to 30% m, and optionally up to 20% m.

According to embodiments of the present invention, there is provided a process that blends either as a dry or wet mix the solid particulate matter of de-watered, demineralised microfine coal (PCP), suitably in a feedstock petroleum or coal tar pitch. Suitably the PCP is utilized as an additive to increase the QI content of a feedstock pitch, such as a petroleum pitch. The amount of microfine PCP coal that may be blended with the feedstock pitch is at least 1% m (one mass percent), not less than 1% m, 5% m, 10% m, or 20% m; and/or not more than 90% m, 75% m, 60% m, or 50% m. Hence, the microfine coal component may comprise a majority, by mass, of the resultant blended composition. This allows for considerable economies of production, by replacing a significant proportion of more expensive pitch component with a cheaper solid material that may be derived from waste material (e.g. tailings and mining discard). The combined blend may also be introduced into existing apparatus and processes for the production of downstream products, such as carbon electrodes, without extensive re-design of conventional equipment.

In specific embodiments, the invention provides for the blending or mixing of de-watered, demineralised microfine PCP, within a feedstock pitch having high aromatic content to form a mixture. Typically, the pitch will be derived from aromatic decant oils or from coal tar. Optionally, the pitch feedstock may comprise a quinoline insolubles (QI) content of less than around 10% m, for example, if the pitch feedstock is a petroleum pitch feedstock. Solid pitch may be pulverized to form a particulate composition prior to combination with PCP to form a solid-solid blended mixture. Alternatively, the pitch may be molten, and blending may occur at a temperature higher than the softening point of the pitch but below the temperature at which the pitch would pyrolyze to form coke. In a wet mix such as this, the PCP forms inclusions or a suspension within the pitch.

According to further specific embodiments of the invention, at least about 90% by volume (% v) of the PCP particles are no greater than about 25 µm in diameter; optionally no greater than about 15 µm in diameter, optionally no greater than about 5 µm in diameter. Suitably, the PCP has an ash content of less than about 2% m, suitably less than about 1.5% m; optionally not more than 1% m. Optionally, the PCP has a water content of less than around 2% m and/or a sulfur content of less than around 2% m; optionally no greater than around 1%, optionally no greater than 0.5%.

In a further embodiment of the invention, the PCP may be combined with a component that is a feedstock for a pitch, such as a decant oil which is a feedstock component for production of a petroleum pitch. A decant oil (or slurry oil) is typically the heaviest cut from a refinery fluid catalytic cracker (FCC) and consists of a high-boiling aromatic process oil. The PCP may be utilized as an additive to increase the QI content of a pitch, such as a petroleum pitch, that is produced from a process of distillation of such decant oils. Distillation of decant oil is a refinery process used to extract any residual lighter volatile components and thereby yield a petroleum pitch end product that is solid at ambient temperature. Distillation of decant oils will be carried out below the coking temperature of the oil or pitch (e.g. <450° C. or <842° F.) and is typically conducted under reduced pressure or around vacuum to limit further cracking of the decant oil (e.g. 5 mmHg to 0.3 mmHg). The amount of microfine PCP coal that may be blended with the feedstock decant oil is at least 1% m (one mass percent), not less than 1% m, 5% m, 10% m, or 20% m; and/or not more than 90% m, 75% m, 60% m, or 50% m. Hence, the microfine PCP component may comprise a majority, by mass, of the resultant blended composition if desired.

In embodiments of the invention, the combined aggregate, or 'green' material prepared from or comprising the pitch/PCP blends described herein may be subjected to one or more calcination steps, in order to produce a calcined product. Calcined product is used in a variety of industries and applications; in particular, it is a valuable material for production of carbon anodes and electrodes, electrical components such as commutator brushes, for use in the manufacture of lithium batteries and in aluminium or steel smelting. Coke, such as pet coke, may be combined with pitch/PCP blend as binder, and the combined mixture packed into a mold or otherwise formed into the shape of an electrode. The mixture may be calcined (or baked) in rotary kilns and heated to temperatures between 1100 and 1350° C. (2192 to 2460° F.). The elevated heat treatment removes any excess moisture, extracts all remaining hydrocarbons, and modifies the crystalline structure of the mixture, resulting in a dense electrically conductive product.

According to specific embodiments of the invention the use of the PCP as an additive blend component within a binder pitch contributes to a number of improved properties in resultant baked electrodes. In particular, where such electrodes are intended for use in electrolytic cells—such as in the smelting of aluminium—the electrodes show a much-reduced reactivity with air and/or carbon dioxide. ISO 12989 and 12988 specify a loss in mass method for the determination of the reactivity of carbonaceous products to carbon dioxide and air respectively. These methods were developed especially for baked anodes, of the type described herein, and typically those electrodes used in the production of aluminium. A reduction in reactivity to air and/or carbon dioxide, therefore, extends the working life of the electrode reducing the frequency of replacement.

In embodiments of the invention, the inclusion of PCP in the binder pitch can reduce the rate of electrode loss due to air reactivity by around two thirds compared to conventional electrodes. Specific embodiments of the invention provide for a method for improving the air and carbon dioxide reactivity of an electrolytic carbon electrode comprising PCP incorporated into a binder pitch used in the manufacture of the electrode. The PCP is in particulate form, as described substantially as above, and particularly wherein at least about 90% by volume (% v) of the particles are no greater than about 25 µm in diameter; and wherein the PCP has an ash content of less than about 5% m. Optionally, PCP has a water content of less than around 5% m. The methods of the invention may provide for a reduction in loss of electrode mass due to air reactivity as determined by ISO 12989-1 by at least 3%, or even as much as 5% or more. The methods of the invention may also provide for a reduction in loss of electrode mass due to carbon dioxide reactivity as determined by ISO 12988-1 by at least 2%.

The invention is further illustrated by the following non-limiting examples.

EXAMPLES

Example 1

In this example the PCP used is a highly upgraded micro-fine form of coal with less than about 1% ash, less than 0.5% sulfur. In this PCP sample 100% of the particles were below 10 microns in size, 80% of the particles were below 5 microns in size, the mean particle size was approximately 3 microns, and approximately 10% of the particles were below 1 micron size. Thus, the particle size distribution of the PCP was similar to that of primary QI and consistent with the size needed to penetrate the anode coke without causing pore blocking.

This upgraded coal material is recovered from waste coal fines generated as a by-product of coal mining operations.

Petroleum pitch typically only contain a small amount (<1 to 5% m) of primary quinoline insolubles (QI). The present example seeks to examine whether addition of PCP to refinery processes to produce petroleum pitch increases the yield of petroleum pitch, and also potentially reduces cost by displacing some volume of pitch with QI derived from the PCP. An advantage of high QI is that further providing solids that reduce shrinkage cracks when the petroleum pitch is utilised in carbon anode production.

Petroleum pitch can be produced simply by the distillation of decant oil or more typically it can be produced by the thermal treatment of decant oil under pressure. The later method is proposed to benefit most from the addition of PCP due to the high temperatures and sufficient residence time allowing maximum time for the reaction of decant oil and PCP.

EXPERIMENTAL

Samples

Decant oil, of the type typically used to produces mesophase pitch for carbon fibres (CFDO), was used to test operating conditions in a reactor to produce isotropic petroleum pitch by thermal soaking methods. PCP (derived from waste obtained from a former bituminous coal processing site in Kentucky, USA) was used to co-process with the petroleum pitch.

Petroleum Pitch Pyrolysis

A Parr Autoclave reactor was charged with either with CFDO or CFDO+PCP and purged with nitrogen and pressurized to 300 or 1000 psi (2068 kPa or 6894 kPa). The reactor was brought up to the desired temperature with stirring and autogenous pressure. A PID controller and internal thermocouple was used to measure and maintain temperature. The time for the thermal soak was started when the temperature was within 5° C. of the target temperature. After completion of the reaction, the reactor was depressurized. During initial scouting of experimental conditions, the pitch was poured out of the reactor at an elevated temperature (~120° C.).

Vacuum Distillation

Distillations were performed using a vacuum-jacketed short patch distillation apparatus fitted with a thermometer. A silicone oil bath was used to control the temperature and a high vacuum line was used to provide the reduced pressure so that distillations could be performed at much lower pot temperature than atmospheric distillation. Vacuum distillation is preferred because it ensures that the composition of the products is unaltered by additional thermal cracking. Samples were either distilled to 5 mmHg or to 0.3 mmHg.

Quinoline-Insoluble (QI) Determination

Quinoline is highly toxic, expensive, and the ASTM D2318 procedure is very time consuming. It has been determined that N-methyl-2-pyrrolidone (NMP) produces insoluble gravimetric results that are very similar to QI values (L. C. de Freitas and L. D. de Castro, Correlations between quinoline and NMP insolubles in petroleum pitches, Fuel 2008, 87, 2842-2845) and this method of estimating QI is now preferred. Consequently, for quantitative evaluation of the pitch, the NMP was used to dissolve and collect all the contents in the reactor. Residues from vacuum distillation were dissolved in NMP at ambient temperature and filtered through either a glass microfiber filter (for low volumes and low insolubles) or through a bed of dried celite. After filtration, the filter materials and filter cake were rinsed with additional NMP until the filtrates emerged pale yellow or colorless. Excess NMP was removed by rinsing with lower boiling point solvents and the samples were dried overnight in a vacuum oven before gravimetric determination.

Softening Point

Measurements were performed using a Mettler Toledo Dropping Point apparatus DP-70 according to ASTM D3104-14a.

Asphaltene Content

Samples were analysed by a combined HPLC and solubility method that assesses the saturate, aromatic, and resin content using an asphaltene determinator called SAR-AD (Boysen, R. & Schabron, J., Automated HPLC SAR-AD Separation: Fundamental Properties of Asphalts and Modified Asphalts III Product, Technical White Paper FP 01, Western Research Institute, Laramie, WY, USA, March 2015, also Boysen, R. B.; Schabron, J. F. The Automated Asphaltene Determinator Coupled with Saturates, Aromatics, Resins Separation for Petroleum Residua Characterization. Energy Fuels 2013, 27, 4654-4661, and Adams, J. J.; Schabron, J. F.; Boysen, R. Quantitative Vacuum Distillation of Crude Oils to Give Residues Amenable to the Asphaltene Determinator Coupled with Saturates, Aromatics, and Resins Separation Characterization. Energy Fuels 2015, 29, 2774-2784).

Results and Discussion

Petroleum Pitch optimization

Reactions for the pyrolysis of slurry oil or decant oil were used to increase the petroleum pitch yield, coking value and softening point, relative to simple distillation. With recycling of the lighter cracked fractions, the production of petroleum pitch can reach around 90% whereas distillation is highly dependent on the feed but can be as low as 5% and as high as 20%. A set of reaction conditions were scouted to produce petroleum pitch from CFDO prior to production of the petroleum pitch in the presence of PCP. The reaction conditions for producing petroleum pitch by batch processes in the literature cover a wide range of conditions, and in the patented literature, the range is even larger owning to continuous operations which can operate at much higher temperatures and lower residence times.

Although cracking begins at around 360° C., the kinetics of cracking increase significantly around 400° C. which is useful for reasonable production times. As the temperature is increased above 400° C. the reactions proceed more quickly, however this increase needs to be limited as it can lead to the undesirable formation of coke and mesophase. Pressure is used to keep volatiles in solution to reduce the viscosity of the decant oil and to help minimize the formation of mesophase. Typically, reactions to form petroleum pitch can occur over the course of several hours (up to around 20 hrs or more) when performed at around 400° C., and reaction times can be decreased to less than about 6 hours when 430° C. is used.

TABLE 1

Reaction conditions used to convert CFDO to petroleum pitch together with softening point (SP), asphaltene content and NMP-insolubles (closely equivalent to QI) for petroleum pitch products with comparison to commercial petroleum pitch products (CFDO-PP-19 and 10).

| | Distilled to 5 mm Hg | | | | Distilled to 0.3 mm Hg | | Commercial petroleum pitches | |
|---|---|---|---|---|---|---|---|---|
| | Sample ID: | | | | | | | |
| | PSO #2 | PSO #6 | PSO #7 | PSO #9 | PSO #11 | PSO #12 | CFDO-PP-19 | 10 |
| Arq Fuel (% m) | 0 | 0 | 0 | 0 | 0 | 10 | — | — |
| Temperature (° C.) | | | | 430 | | | — | — |
| Pressure (psi) | | | | 300 | | | — | — |

TABLE 1-continued

Reaction conditions used to convert CFDO to petroleum pitch together with softening point
(SP), asphaltene content and NMP-insolubles (closely equivalent to QI) for petroleum pitch
products with comparison to commercial petroleum pitch products (CFDO-PP-19 and 10).

| | Distilled to 5 mm Hg | | | | Distilled to 0.3 mm Hg | | Commercial petroleum pitches | |
|---|---|---|---|---|---|---|---|---|
| | Sample ID: | | | | | | | |
| | PSO #2 | PSO #6 | PSO #7 | PSO #9 | PSO #11 | PSO #12 | CFDO-PP-19 | 10 |
| Time (hours) | 2.0 | 2.5 | 3.0 | 4.0 | 3.0 | 3.0 | — | — |
| Softening Point (° C.) | 67.6 | 73.4 | 78.1 | 88.3 | 152.7 | 170.2 | 116.2 | 94.2 |
| QI (NMP) insoluble (% m) | 0.62 | 0.42 | 0.79 | 1.99 | 9.9 | 17.1 | 2.67% | — |
| Asphaltenes (% m) | 5.3 | 12.3 | 11.7 | 13.2 | — | — | 16.0 | 14.3 |

Reaction conditions between 400° C. and 430° C. were investigated to establish the balance between the reaction time and improved conversion yields for CFDO. After performing reactions from 2 hrs to 4 hrs the hot pitch was distilled, and a subsample taken for determination of QI. For reaction times of 430° C. raw pitch samples were distilled under a vacuum of 5 mmHg and the softening point (SP) and asphaltene content was determined, Table 1. Softening point and asphaltene content was found to increase with reaction time.

Commercial petroleum pitch samples contain more asphaltenes than pitches produced from CFDO alone, Table 1, and the SP is lower than desired. Commercial petroleum pitch samples contain more asphaltenes than pitches produced from CFDO alone, Table 1, and the SP is lower than desired. The SP of the pitch and the asphaltene content can be increased by using more forcing distillation conditions to remove more of the lighter ends.

Figure 1:
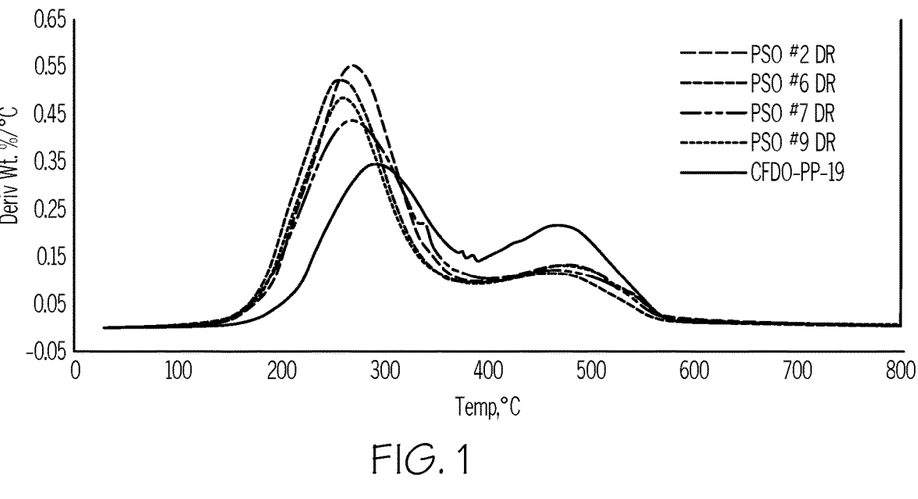
FIG. 1 is a graph showing a derivative TGA profile for petroleum pitch produced from a carbon fiber decant oil (CFDO) feedstock at 430° C. at different reaction times compared to a commercially produced CFDO-PP-19.

The extent of distillation can be inferred from thermogravimetric analysis (TGA). FIG. 1 shows TGA of the various distilled pitches from CFDO at various times, and commercially produced CFDO-PP-19. The various CFDO distilled pitches contained much more volatile matter below 395° C. than the commercial pitch. Hence there is scope to improve SP and asphaltene content by reducing this volatile matter content and either distilling at higher temperatures or at a higher vacuum (lower pressure).

In test PSO #11 a higher vacuum distillation was carried out on the reaction product from a 3-hour experiment at 430° C. and 300 psi by lowering Hg pressure from 5 mm (as in PSOC #7) to 0.3 mm. This increased the SP from 78.1° C. to 152.7° C., Table 1. At the same time QI was increased from 0.79% m to 9.9% m.

For test PSO #12 a blend of PCP (10% m) in the decant oil CFDO, then reacted and distilled under the same conditions as test PSO #11. The resultant SP from this test was increased a further 17.5° C. to 170.2° C. from 152.7° C. fir PSO #11, Table 1. Unexpectedly, there is significantly more QI produced than anticipated increasing by 7.2% m from 9.9% m (PSO #11) to 17.1% m. This corresponds to a conversion of 71% PCP into QI. Hence, inclusion of a relatively modest amount of PCP exhibited quite profound effects upon the properties of the CFDO. This is surprising because one would not expect such a large proportion of the PCP to be converted to QI, given that the PCP will contain an amount of volatile and other components that are not generally considered to be readily convertible to QI in this temperature range which is below the coking temperature of both the decant oil and the PCP.

NMP is commonly used as the most effective solvent for preparing high yields of low ash coal extracts by solvent extraction. The yields of NMP-solubles from bituminous coals can reach 80% m to 90% m depending on the coal source and extraction conditions. (B. Chawla & B. H. Davis, Effect of Temperature and Solvent on Coal: Extraction under Mild Conditions, Fuel Processing Technology, 1989, 23, pp. 133-148 and J. Wang, C. Lia, K. Sakanishia, T. Nakazatob, H. Taob, T. Takanohashia, T. Takaradac & I. Saitoa, Investigation of the remaining major and trace elements in clean coal generated by organic solvent extraction, Fuel, 2005, 84, pp. 1487-1493).

TABLE 2

Yields of Pitch, Tar, QI and Volatile Matter (VM) from
thermal reaction (3 hours @ 430° C. under
300 PSI pressure) of CFDO and from a 10% blend of PCP in CFDO.

| | | Experiment | |
|---|---|---|---|
| | | PSO #11 | PSO #12 |
| Feed composition | | 100% Decant Oil 0% PCP | 90% Decant Oil 10% PCP |
| Feed weights (g) | Decant Oil | 65.2 | 58.6 |
| | PCP | 0.0 | 6.5 |
| | Blend | 65.2 | 65.1 |
| Product weights (g) | Light ends & gases (VM) | 31.2 | 26.4 |
| | NMP Solubles (Tar) | 27.5 | 27.6 |
| | QI (NMP Insolubles) | 6.5 | 11.1 |
| | Pitch (Tar + QI) | 34.0 | 38.7 |
| Product yields (% m) | Light ends & gases (VM) | 47.9 | 40.6 |
| | NMP Solubles (Tar) | 42.2 | 42.3 |
| | QI (NMP Insolubles) | 9.9 | 17.1 |
| | Pitch (Tar + QI) | 52.1 | 59.4 |

The 10% m PCP in CFDO blend produced:

significantly more pitch than the CFDO alone: an increase of 7.3% m to 59.4% m for PSO #12 from 52.1% m for PSO #11;

much less volatile matter—the yield of light ends and gases was concomitantly lower (7.3% m);

almost the same amount of tar (NMP solubles, both with and without PCP: 42.3% m (PSO #12) compared with 42.2% m (PSO #11).

This is an important result as the objective here is to increase both pitch and QI yields, yet to reduce production of the less valuable volatile matter component. The processing temperatures selected have been designed to exploit the reactivity of PCP with crude oil and its components.

Example 2

This experiment relates to increasing the carbon content in binder pitch to ultimately increase the density, physical, and chemical properties of a baked anode such as those used in electrical batteries or in the aluminium smelting industry.

Residual carbon yield from various blends of PCP with coal tar pitch and with petroleum pitch have been determined. The PCP used in example 2 was the same sample used in Example 1.

Blending Procedure

Both petroleum-based and coal tar-based pitches are very viscous and sticky at reasonable working temperatures (100-150° C.). However, these pitches are quite solid and brittle at room temperature. To facilitate the creation of a uniform mixture of PCP with pitch, the solid pitch was reduced in size to less than 0.25 mm using a bench-top pulverizer and a Tyler screen. The pitch was pulsed briefly in the pulverizer to break up large particles without generating significant amounts of heat. The granular mass from the pulverizer was then screened at 0.25 mm, the fines (−0.25 mm fraction) were retained, and the "overs" (+0.25 mm fraction) were returned to the pulverizer. This avoided any pitch melting and coating of the pulverizer blades and chamber.

Appropriate amounts of pulverized pitch and PCP were then dry blended (i.e. blended as two solids) until a thoroughly homogenized blend was obtained. This was facilitated by the small particle size of both the pitch and PCP material.

Finally, the homogenized mass was heated sufficiently to melt the pitch, and the mixture was further blended using a bench-top mixer. The pre-blending afforded better dispersion of the PCP into the pitch matrix and avoided surface tension issues.

Analytical Procedure

As a calibration point, we used two reference pitches: a petroleum pitch with a carbon content measured at 50-52%, and a coal tar pitch with a carbon content measured at 58-60%.

A small (~1 gram) sample of pitch was placed into a 15 ml nickel crucible and capped with a top containing a 1 mm pin hole. The crucible was heated to 550° C. and held at temperature for 1 hour. The crucible was then cooled and weighed to determine the amount of residual coke.

This procedure adequately replicates the Alcan test (ASTM 4715) without the cumbersome step of packing the sample crucible inside of another crucible and filling the annular space with ground coke to act as an oxygen barrier.

Petroleum Pitch Blends

Figure 2:
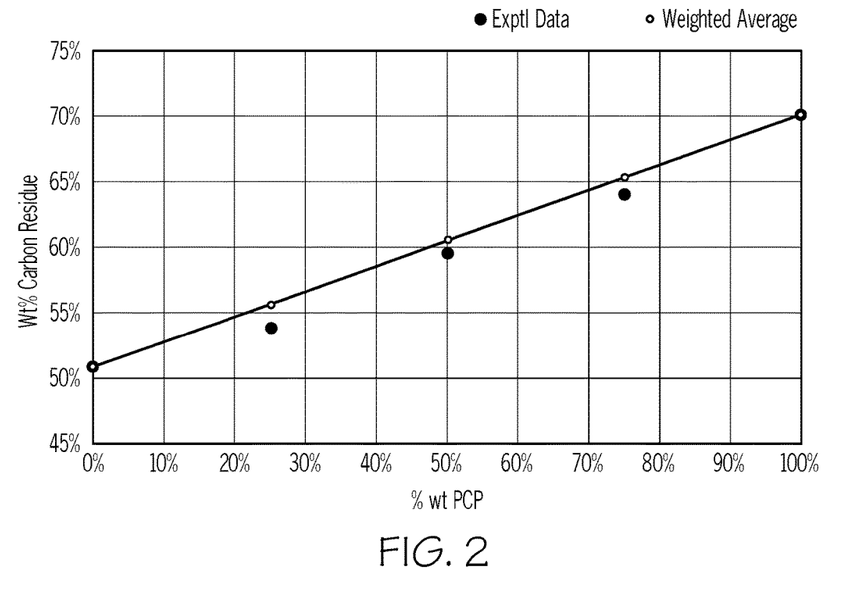
FIG. 2 is a graph that shows the results of a test for carbon residue level in a range of blends of petroleum pitch and PCP.

Blends of petroleum pitch and PCP obtained from Corbin coal (Kentucky, USA) were created at 0% m, 25% m, 50% m, 75% m, and 100% m PCP. Each blend was subjected to the modified Alcan test 3 to 5 times, and the results shown in Table 3 and FIG. 2 are the average of those experiments. In general, the standard deviation between runs for any given blend was typically less than 1%.

The experimental data show that the blends of PCP and petroleum pitch have a carbon residue just slightly less than that calculated from a weighted average of the "coal alone" and "pitch alone" experiments. This indicates that there is an unexpected interaction between the petroleum pitch and the coal in the PCP that enhances the production of volatiles at the expense of solid products. These volatiles are potentially valuable (e.g. as lighter gasoline or diesel fractions) and can be captured in refinery processes.

By blending PCP with petroleum pitch, the carbon residue can be increased from about 52% for petroleum pitch alone to almost 65% for a 25% pitch/75% PCP blend. This exceeds even the typical value of about 60% residual carbon for coal tar pitch alone. In general, greater values of carbon residue in pitch when used in anode production result in more dense carbon electrodes with lower porosity. This surprising finding facilitates increased use of petroleum pitch in the production of pressed and pre-baked carbon anodes with low porosity.

TABLE 3

Carbon residue values determined from Alcan tests

| Blend Composition | | | Carbon Residue | |
|---|---|---|---|---|
| Pitch % m | PCP | No. of measurements | mean % m | s.d. |
| 0 | 100 | 3 | 70.1 | 0.54 |
| PETROLEUM PITCH | | | | |
| 25 | 75 | 4 | 64.0 | 0.54 |
| 50 | 50 | 3 | 59.5 | 0.09 |
| 75 | 25 | 4 | 53.8 | 0.32 |
| 100 | 0 | 3 | 50.9 | 1.03 |
| COAL TAR PITCH | | | | |
| 25 | 75 | 4 | 65.9 | 0.81 |
| 50 | 50 | 4 | 62.6 | 0.72 |
| 75 | 25 | 4 | 59.0 | 0.28 |
| 100 | 0 | 3 | 58.8 | 0.86 |

Coal Tar Pitch Blends

Figure 3:
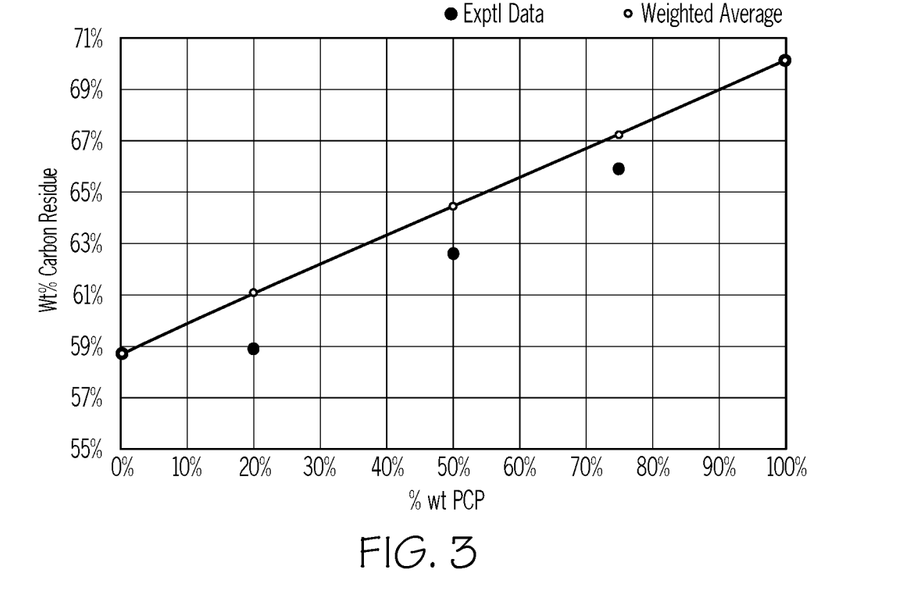
FIG. 3 is a graph that shows the results of a test for carbon residue level in a range of blends of petroleum pitch and PCP.

Blends of coal tar pitch and PCP were also created at 0% m, 25% m, 50% m, 75% m, and 100% m PCP. Each blend was subjected to the modified Alcan test 3 to 5 times, and the results shown in FIG. 3 and Table 3 are the average of those experiments. In general, the standard deviation between runs for any given blend was typically less than 1%.

The experimental data show that the blends of PCP and coal tar pitch have a carbon residue several percentage points less than that calculated from a weighted average of the "coal alone" and "pitch alone" experiments. This indicates that there is even more interaction between the coal tar pitch and the PCP coal than in the petroleum pitch and coal blends described above. Again, surprisingly this reaction enhances the production of volatiles at the expense of solid products.

By blending PCP with coal tar pitch, the carbon residue can be increased from about 59% for coal tar pitch alone to 66% for a 25% pitch/75% PCP blend. This exceeds the typical value of about 60% residual carbon for coal tar pitch by almost 10%. It is anticipated that this could lead to even further improved carbon electrode properties.

CONCLUSIONS

1) By pulverizing petroleum pitch or coal tar pitch, it is possible to make homogeneous, reproducible blends of PCP and pitch.

2) PCP has a residual carbon content greater than that of either petroleum or coal tar derived pitch.

3) The blends of PCP and pitch have a carbon residue content just slightly less than that of the weighted average of the coal alone and pitch alone, indicating that there is some chemical reaction between the coal and pitch that lead to a slight increase in volatiles production.

4) By blending PCP with petroleum pitch, it is possible to increase to carbon residue to values greater than that of coal tar pitch alone. This supports the use of PCP as an additive to improve suitability of petroleum pitch for carbon electrode production.

5) By blending PCP with coal tar pitch, it is possible to further increase the carbon residue above that of coal tar pitch alone by about 10%. This supports the use of PCP as an additive to further improve the properties of coal tar pitch for carbon electrode production.

6) Blends of either coal tar pitch or petroleum pitch and PCP can lead to increased density and decreased porosity in the production of pressed and baked carbon anodes.

Hence the methods of the invention provide improved pitches suitable for making composite carbon materials that can be used in applications requiring enhanced thermal, electrical and mechanical properties, both as a binder and as a filler to improve physical and chemical properties of such material.

Example 3

Bench scale anodes at different binder contents were produced and analyzed.

The dry aggregate used for the production of the bench scale anodes was composed of two petroleum cokes and one butts type, having the properties as shown in the Table 4 below.

TABLE 4

|  | COKE 1 | COKE 2 | BUTTS |
|---|---|---|---|
| S Content [%] | 2.5 | 1.2 | 1.8 |
| V Content [ppm] | 200 | 100 | 150 |
| Na Content [ppm] | — | — | 350 |

Dry aggregate was prepared having the composition of Table 5 below.

TABLE 5

| recipe for dry aggregate preparation | | | | |
|---|---|---|---|---|
| FRACTION [mm] | COKE 1 [%] | COKE 2 [%] | BUTTS [%] | TOTAL [%] |
| 8-4 | 2.7 | 1.3 | 10.0 | 14.0 |
| 4-2 | 5.3 | 2.7 | 6.0 | 14.0 |
| 2-1 | 6.7 | 3.3 | 4.0 | 14.0 |
| 1-0.5 | 7.3 | 3.7 | 3.0 | 14.0 |
| 0.5-0.25 | 8.0 | 4.0 | 2.0 | 14.0 |
| FINES 3500 Blaine | 20.0 | 10.0 | 0.0 | 30.0 |
| TOTAL | 50.0 | 25.0 | 25.0 | 100.0 |

The recipe presented in the Table 5 was selected in order to obtain typical properties for bench scale anodes when using a conventional coal tar pitch as the binder.

To determine the effect of the binder content, a number of recipes were prepared with different pitch additives in order to provide a comprehensive review of the anode quality:
 comparative—13, 14, 15 and 16% wt conventional coal tar pitch
 experimental—15, 16 and 17% wt pitch comprising 9:1 mixture of coal tar pitch and PCP (as described previously)

Figure 4:
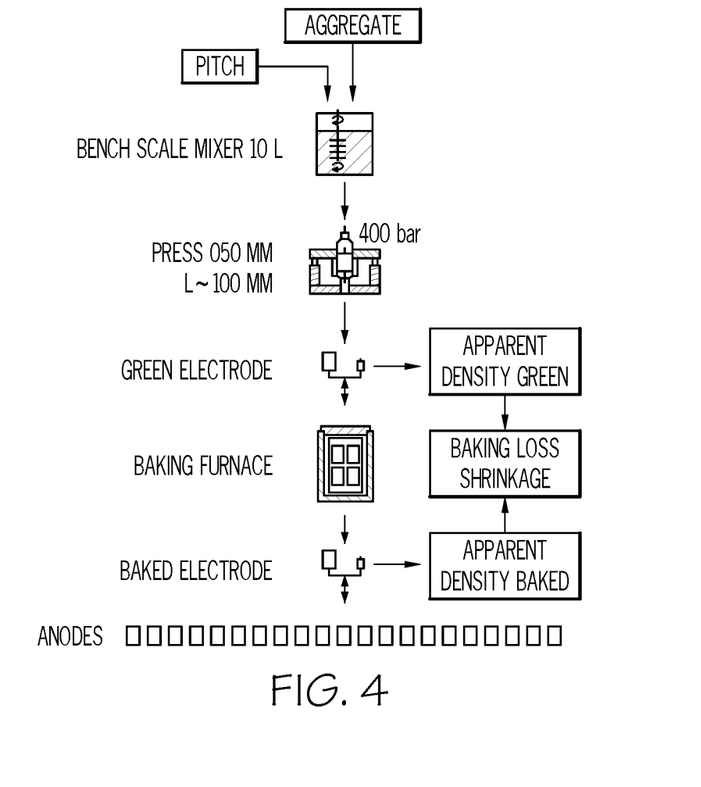
FIG. 4 shows a process work flow diagram for the production of bench scale electrolytic anodes according to one embodiment of the invention.

A flow chart depicting the bench scale anode production process is shown in FIG. 4. The recipes were preheated in an oven at 200° C. for 12 hours and a 10 litre intensive Eirich mixer was then heated to 173° C. (60° C. higher than the Mettler softening point of the typical anode binder). To the 4 kg standard recipe, the different granular binders were added, and then mixed for 10 minutes, this being the time necessary for the green paste to reach a temperature of 173° C. These preheating and forming temperatures were adapted according to the softening point of the binder. Bench scale anodes were produced for each pitching level for the evaluation of the binder with and without PCP additive.

Each set of test anodes were baked in an electrically heated furnace (5 kW) using petroleum coke (2-1 mm) as packing material. Three different temperature gradients were used according to Table 6.

TABLE 6

| Anode baking program | |
|---|---|
| Temperature | Gradient |
| 20 to 150° C. | 100° C./h |
| 150 to 300° C. | 10° C./h |
| 300 to 1100° C. | 50° C./h |

The baking time at 1100° C. was 20 hours. The apparent densities of the bench scale anodes were measured before and after baking and the baking loss and shrinkage were calculated. The measurement of the physical and chemical properties was performed on the test bench scale electrode.

Results

The properties measured of the typical anode binder and on the one with PCP additive are shown in the Table 7 below.

TABLE 7

| Property | | Method | Unit | Typical Anode Binder (COMP) | 90% Typical Anode Binder + 10% PCP |
|---|---|---|---|---|---|
| Water Content | | ISO 5939 | % | 0.00 | 0.00 |
| Fractionated Distillation | 0-270° C. 0-360° C. | ASTM D2569 | % % | 0.9 4.8 | 1.1 7.4 |
| Softening Point Mettler | | ISO 5940-2 | ° C. | 114.8 | 124.6 |
| Viscosity at | 140° C. | ASTM D5018 | cP | 13422 | — |
|  | 150° C. | | cP | 4618 | 39400 |
|  | 160° C. | | cP | 1830 | 15300 |
|  | 170° C. | | cP | 870 | 6912 |
|  | 180° C. | | cP | 462 | 3770 |
|  | 190° C. | | cP | — | 2170 |
|  | 200° C. | | cP | — | 1580 |
| Real Density in Helium | | ISO 21687 | kg/dm³ | 1.314 | 1.319 |
| Coking Value | | ISO 6998 | % | 57.3 | 60.6 |
| Quinoline Insoluble | | ISO 6791 | % | 7.2 | 16.5 |
| Toluene Insoluble | | ISO 6376 | % | 28.4 | 34.4 |
| Ash Content | | ISO 8006 | % | 0.19 | 0.31 |
| Wetting Power | | M163-1 | — | 1.74 | 0.08 |
| Plastograph at | 25% | M102 | ° C. | 160 | — |
|  | 27% | | ° C. | 148 | 193 |
|  | 29% | | ° C. | 147 | 182 |
|  | 31% | | ° C. | 139 | 175 |
|  | 33% | | ° C. | 136 | 167 |

The novel binder composition was comparable in handling to the typical comparative binder in most characteristics—especially in terms of real density in helium. However, it was noticeable that the quinoline insoluble content and coking values were increased significantly. Whilst both parameters are desirable the latter observation is particularly positive as a higher coking value means higher carbon remaining after cokefaction and a potentially higher baked anode density can be achieved. The properties of the test anodes made with the comparative typical binder and on the one with PCP additive are shown in the Table 8 below.

TABLE 8

Bench scale anode properties at the optimum binder content

| Property | Method | Unit | Typical Anode Binder (COMP) | Binder with 10% PCP |
|---|---|---|---|---|
| Optimum Binder Content | — | % | 15 | 16 |
| Green Apparent Density | ISO 12985-1 | kg/dm$^3$ | 1.649 | 1.645 |
| Baking Loss | M131-1 | % | 5.3 | 5.7 |
| Baking Shrinkage | M132-1 | % | 0.8 | 0.1 |
| Sticking of Packing Material | M133 | % | 0.4 | 0.3 |
| Baked Apparent Density | ISO 12985-1 | kg/dm$^3$ | 1.569 | 1.553 |
| Specific Electrical Resistance | ISO 11713 | μΩm | 59.6 | 58.4 |
| Compressive Strength | ISO 18515 | MPa | 39 | 39 |
| Static Elasticity Modulus | ISO 18515 | GPa | 2.9 | 3.9 |
| Coefficient of Thermal Expansion | ISO 14420 | 10$^{-6}$/K | 4.29 | 4.41 |
| Thermal Conductivity | ISO 12987 | W/mK | 3.40 | 3.39 |
| Real Density in Xylene | ISO 9088 | kg/dm$^3$ | 2.074 | 2.072 |
| $CO_2$ Reactivity Residue | ISO 12988-1 | % | 93.6 | 97.1 |
| $CO_2$ Reactivity Dust | | % | 1.2 | 0.2 |
| $CO_2$ Reactivity Loss | | % | 5.2 | 2.7 |
| Air Reactivity Residue | ISO 12989-1 | % | 74.5 | 93.0 |
| Air Reactivity Dust | | % | 7.9 | 0.2 |
| Air Reactivity Loss | | % | 17.6 | 6.8 |

In comparison to the bench scale anodes produced with the typical anode binder, the following comments can be made on the binder with 10% PCP.

The optimum binder content is increased by approximately 1%. This optimum was selected mainly by looking at the increase of the sticking propensity (corresponding to the packing coke grains stuck on the anode surface after baking) as well as by the lowest air permeability level. The optimum binder content of 16% remains within the acceptable range for bench scale anodes.

An unexpected observation related to the PCP addition is its apparent significant impact on the $CO_2$ and air reactivity figures. Both air and $CO_2$ reactivity residue were strongly increased, which would be highly beneficial for the resulting anode quality and working performance in electrolysis cells over time. Indeed, the air reactivity % loss was improved by more than 10% compared to the reference composition, which was highly unexpected.

Although particular embodiments of the invention have been disclosed herein in detail, this has been done by way of example and for the purposes of illustration only. The aforementioned embodiments are not intended to be limiting with respect to the scope of the invention. It is contemplated by the inventors that various substitutions, alterations, and modifications may be made to the invention without departing from the spirit and scope of the invention.

The invention claimed is:

1. A process for the production of a pitch for use in the manufacture of carbon composite materials, the process comprising the steps of:
   (i) providing a purified coal product (PCP), wherein the PCP is in particulate form, and wherein at least about 90% by volume (% v) of the particles are no greater than about 25 μm in diameter; wherein the PCP has an ash content of less than about 10% by mass (% m) of the PCP; and
   (ii) combining the PCP with a feedstock for pitch to create a combined blended mixture suitable for thermal reaction followed by distillation to create a resultant pitch; wherein the combined blended mixture comprises from around 0.1% m to around 90% m PCP, and wherein the feedstock for pitch comprises decant oil, coal tar, or both.

2. The process of claim 1, wherein the process comprises thermal reaction at:
   a temperature greater than 200° C.;
   a pressure of greater than 1 atmosphere (15 PSI); and
   a reaction time of at least 1 minute.

3. The process of claim 2, wherein the thermal reaction occurs at a temperature of:
   from greater than 200° C. to less than around 400° C., or
   from greater than 200° C. to less than around 360° C.

4. The process of claim 2, wherein:
   the thermal reaction is followed by distillation, or
   the thermal reaction is followed by distillation, the distillation occurring at a pressure below atmospheric pressure.

5. The process of claim 1, wherein:
   the PCP has an ash content of less than about 1.5% m; or
   the PCT has an ash content of not more than 1% m.

6. The process of claim 1, wherein:
   the PCP has a water content of less than around 20% m,
   the PCP has a water content of less than around 5% m, or
   the PCP has a water content of and less than around 2% m.

7. The process of claim 1, wherein;
   the PCP has a sulfur content of less than around 2% m;
   the PCP has a sulfur content of no greater than around 1%; or
   the PCP has a sulfur content of no greater than around 0.5%.

8. The process of claim 1, wherein the combined blended mixture comprises:
   from around 1% m to around 90% m PCP,
   from around 5% m to around 90% m PCP,
   from around 10% m to around 90% m PCP, or
   from around 20% m to around 90% m PCP.

9. The process of claim 1, wherein the composition comprises:
   from around 0.1% m to around 90% m PCP,
   from around 0.1% m to around 75% m PCP,
   from around 0.1% m to around 60% m PCP, or
   from around 0.1% m to around 50% m PCP.

10. A process for the production of a pitch for use in the manufacture of a carbon composite material, the process comprising the steps of:
    (i) providing a purified coal product (PCP), wherein the PCP is in particulate form, and wherein at least about 90% by volume (% v) of the particles are no greater than about 25 μm in diameter, and wherein the PCP has an ash content of less than about 10% by mass (% m) of the PCP; and
    (ii) combining the PCP with a feedstock pitch to create a combined blended mixture;
    wherein the combined blended mixture comprises at least from around 0.1% m and to around 75% m PCP, and
    wherein the feedstock pitch comprises a petroleum pitch derived from decant oil, a coal tar pitch, or both.

11. The process of claim 10, wherein:
    the PCP has an ash content of less than about 1.5% m; or
    the PCT has an ash content of not more than 1% m.

12. The process of claim 10, wherein:

the PCP has a water content of less than around 20% m, the PCP has a water content of less than around 5% m, or the PCP has a water content of less than around 2% m.

13. The process of claim 10, wherein:

the PCP has a sulfur content of less than around 2% m;

the PCP has a sulfur content of no greater than around 1%; or the PCP has a sulfur content of no greater than around 0.5%.

14. The process of claim 10, wherein the combined blended mixture comprises:

from around 1% m to around 75% m PCP, from around 5% m to around 75% m PCP, from around 10% m to around 75% m PCP, or from around 20% m to around 75% m PCP.

15. The process of claim 10, wherein % m of PCP in the combined blended mixture comprises:

from around 0.1% m to 60% m PCP, or from around 0.1% m to 50% m PCP.

16. The process of claim 10, wherein the feedstock pitch comprises a quinoline insolubles (QI) content of up to around 10% m.

\* \* \* \* \*